(12) United States Patent
Reay et al.

(10) Patent No.: US 6,449,858 B1
(45) Date of Patent: Sep. 17, 2002

(54) ANGLE SENSOR

(75) Inventors: Gavin Reay, London; Simon David Heap, Twickenham; Susan J Parker, London, all of (GB)

(73) Assignee: AND Design Limited, London (GB)

(*) Notice: Subject to any disclaimer, the term of this patent is extended or adjusted under 35 U.S.C. 154(b) by 0 days.

(21) Appl. No.: 09/581,769

(22) PCT Filed: Dec. 21, 1998

(86) PCT No.: PCT/GB98/03854
§ 371 (c)(1),
(2), (4) Date: May 1, 2001

(87) PCT Pub. No.: WO99/32851
PCT Pub. Date: Jul. 1, 1999

(30) Foreign Application Priority Data

Dec. 22, 1997 (GB) .............................................. 9726986
Sep. 30, 1998 (GB) .............................................. 9821204

(51) Int. Cl.⁷ ................................................. G01C 9/24
(52) U.S. Cl. .................................. 33/366.12; 33/366.16
(58) Field of Search ............................... 33/366.12, 301, 33/318, 321, 328, 329, 333, 334, 340, 341, 354, 366.11, 366.15, 366.16, 366.23, DIG. 3

(56) References Cited

U.S. PATENT DOCUMENTS

| | | |
|---|---|---|
| 3,791,043 A | 2/1974 | Russell |
| 4,667,413 A | 5/1987 | Pitts |
| 5,150,104 A | 9/1992 | Thomas |
| 5,218,771 A | 6/1993 | Redford |
| 5,317,810 A * | 6/1994 | Isono et al. ............... 33/366.16 |
| 5,392,112 A * | 2/1995 | Nakamura ............... 33/366.23 |
| 5,953,116 A * | 9/1999 | Ohtomo et al. ........... 33/366.23 |
| 6,248,989 B1 * | 6/2001 | Ohishi ..................... 33/366.23 |

OTHER PUBLICATIONS

"Gyroscopes Let Mouse Sense in 3D," *Machine Design*, vol. 64(4), Feb. 20, 1992, pp. 98–99.

* cited by examiner

*Primary Examiner*—Christopher W. Fulton
(74) *Attorney, Agent, or Firm*—Townsend and Townsend and Crew LLP

(57) ABSTRACT

A two-axis angle sensor comprising a pair of bubble chambers (3,4) and associated bubble detectors (5,6). A processor (42) calculates the angle of the sensor by combining the signals from the first and second bubble detectors in accordance with a predetermined algorithm. A radiation source (1) illuminates a bubble (8) with radiation whereby the radiation is refracted by the bubble. A radiation detector (5,6) is positioned to detect the refracted radiation from the bubble and generate a signal indicative of the angle of the bubble chamber. An angle sensor is used to calibrate a vibrating structure gyroscope (70). A flywheel (91) is provided to generate a gyroscopic resistance to operator input. A method of manufacturing a bubble angle sensor is disclosed, the method employing a lid (61) with an internal recess (65).

29 Claims, 10 Drawing Sheets

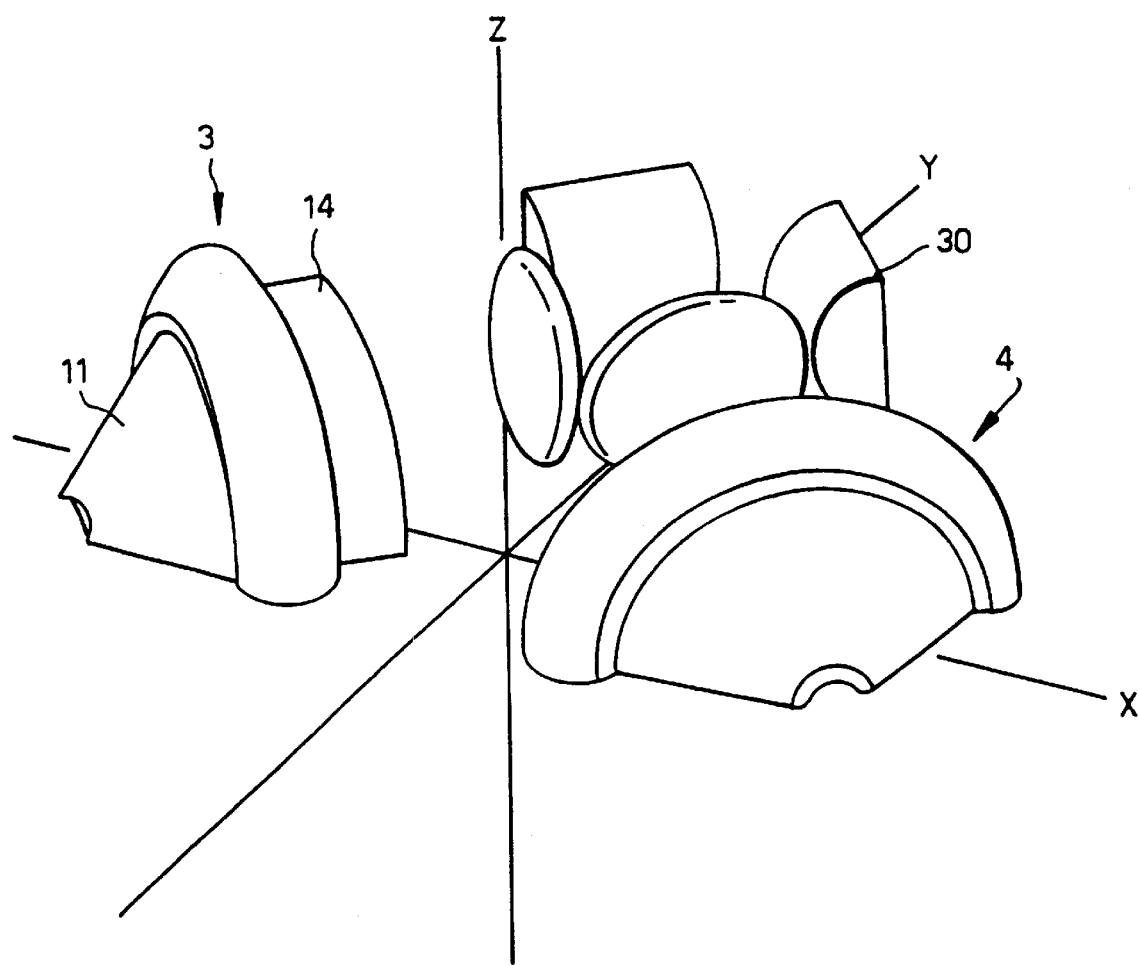

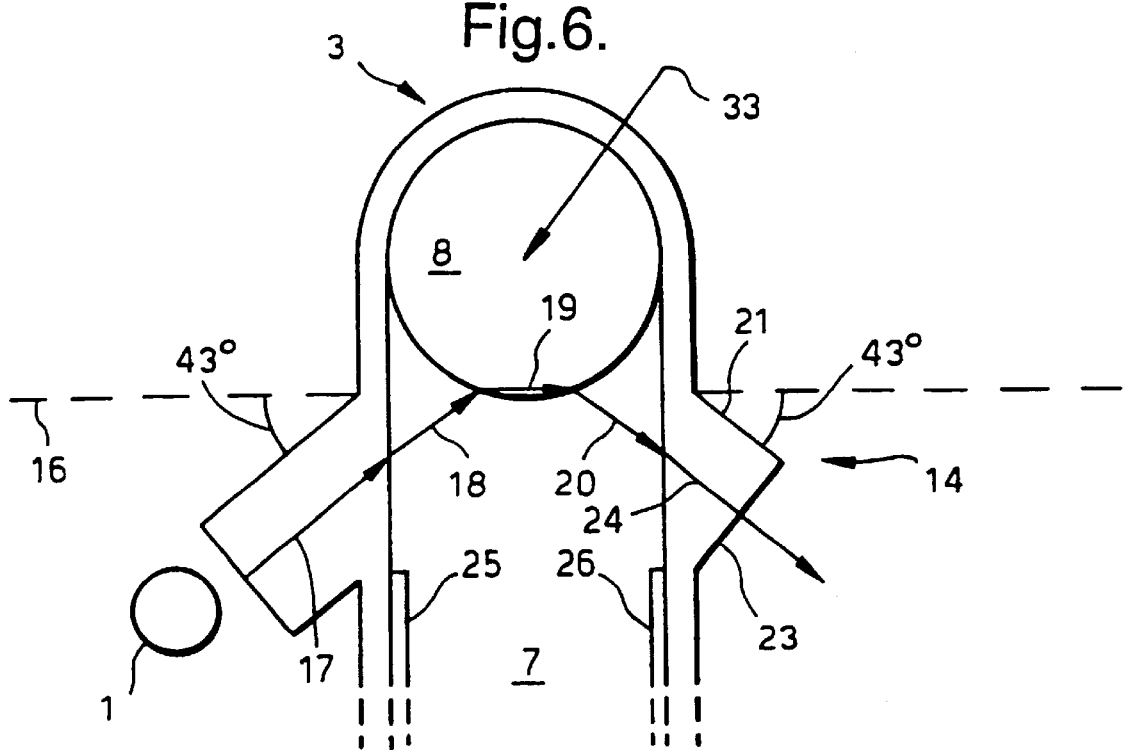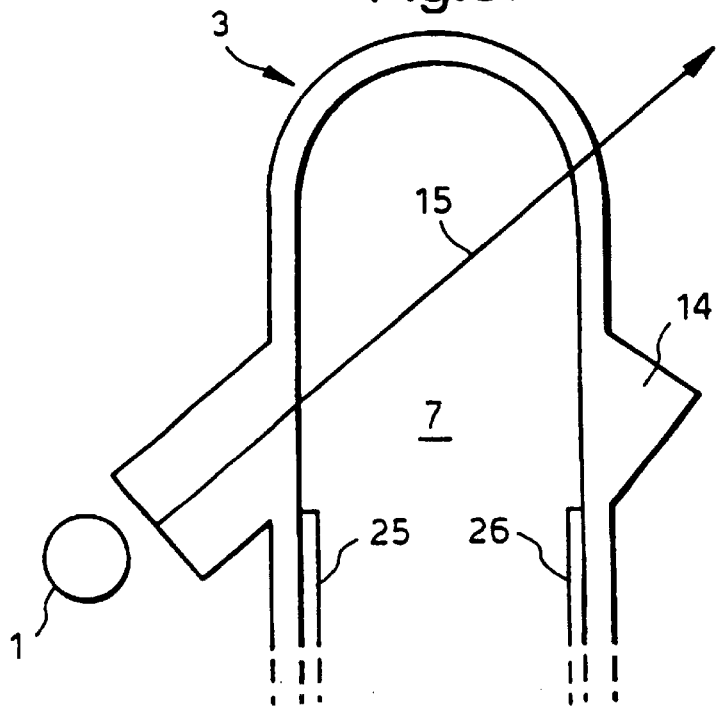

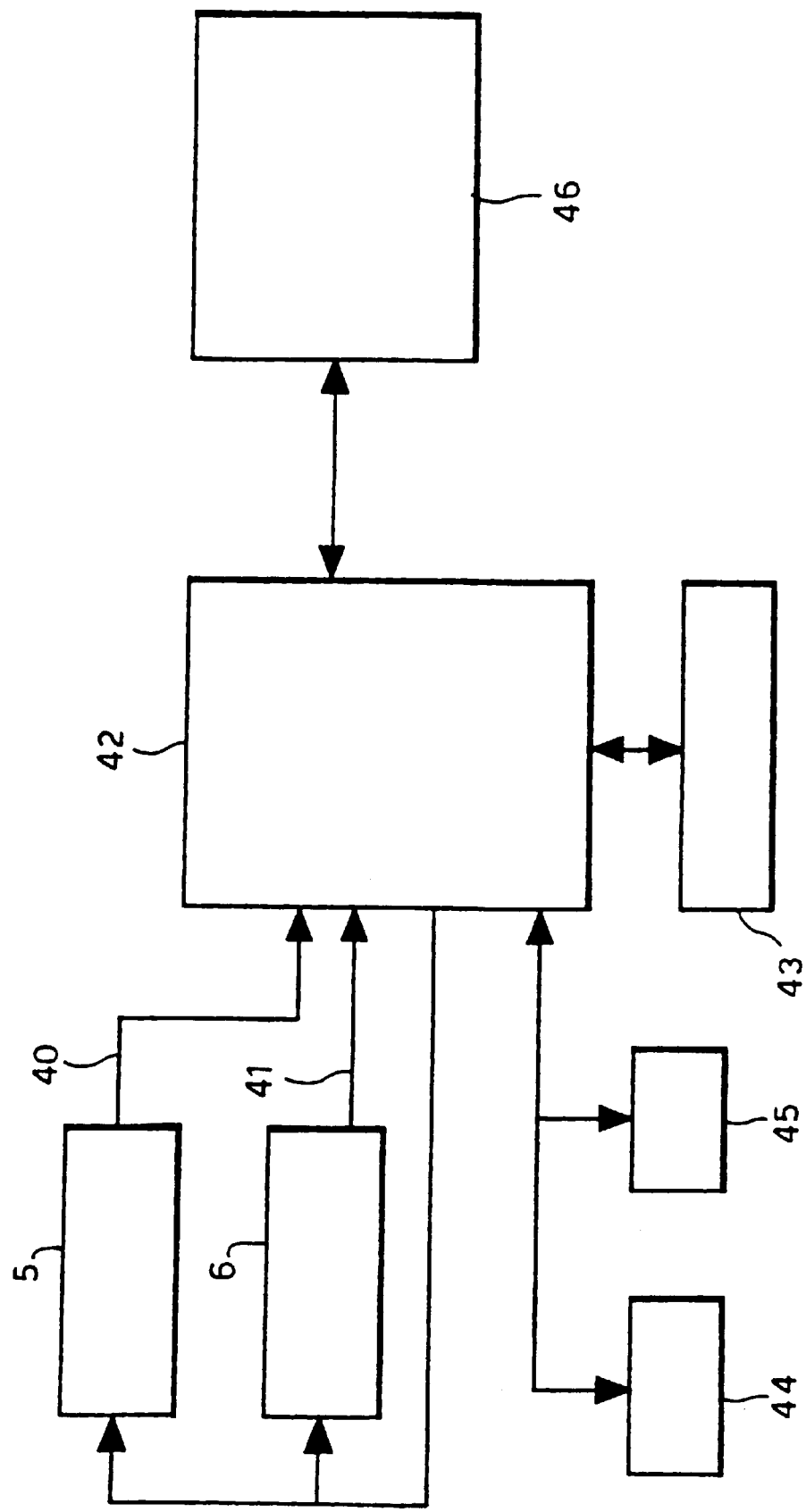

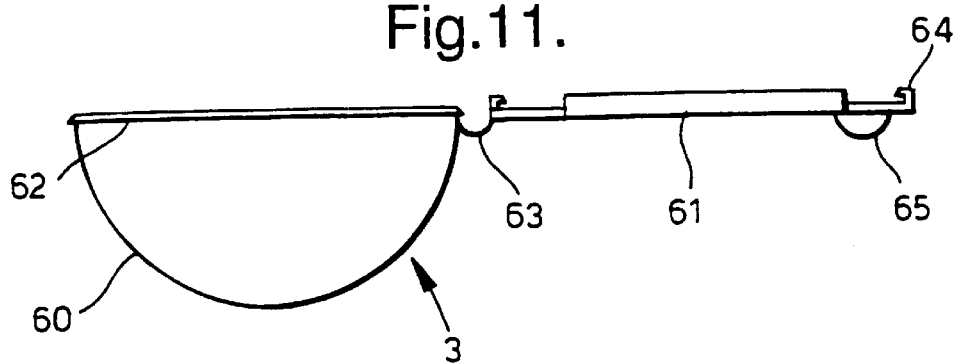
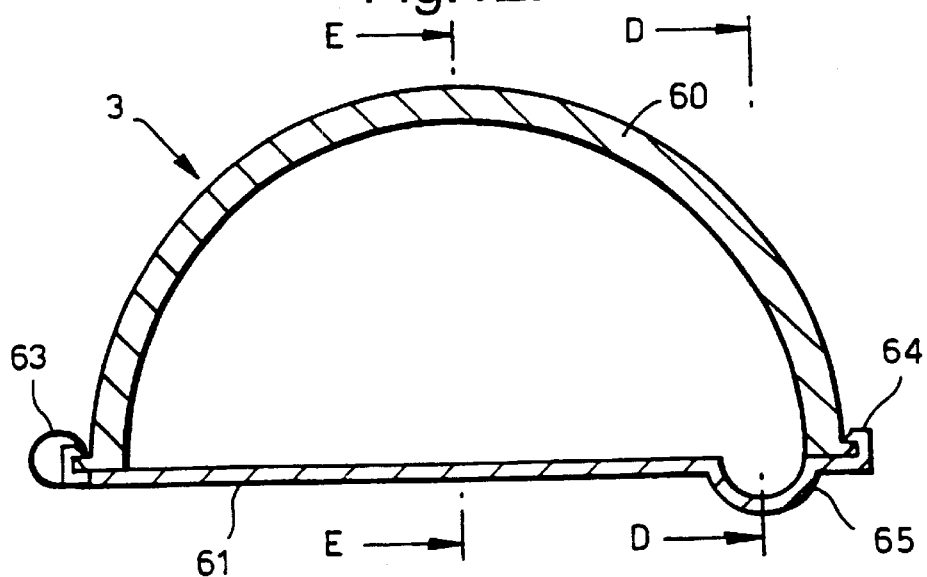
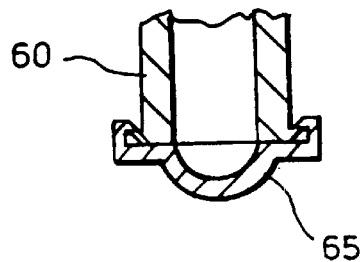
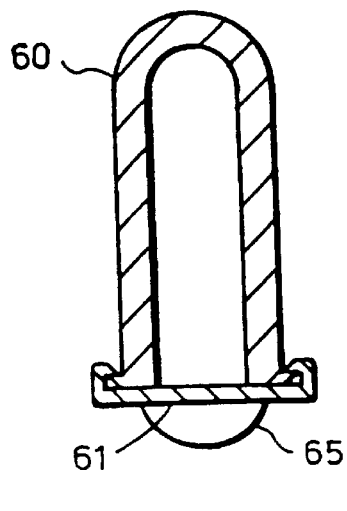

ANGLE SENSOR

The present invention relates to improvements in angle sensors.

In U.S. Pat. No. 5,794,355 a container is formed by a pair of concentrically aligned hemispherical surfaces. The container is filled with a viscous fluid and a bubble of a lighter-weight fluid and placed between a radiation source and a radiation detector. The bubble changes position within the container when the sensor is moved, transmitting a beam of radiation from the radiation source through the bubble to activate a section of the radiation detector while the remainder of the radiation is blocked by the fluid. Two-axis angle sensing is achieved by the use of a radiation detector comprising a two-dimensional array of grid elements (eg photodiodes).

The arrangement of U.S. Pat. No. 5,794,355 suffers a number of problems. Firstly, in order to achieve a measurement range of n measurement units the two-dimensional radiation detector must have n*n grid elements. As n increases the radiation detector can become large and expensive. Secondly, random measurement errors in the signal from the radiation detector can be large.

An alternative method of achieving two-axis angle sensing is suggested in U.S. Pat. No. 5,218,771 at column 4 lines 15–19. This suggests using two angular motion detectors, mounted with their respective central axes oriented perpendicular to each other. However the arrangement of U.S. Pat. No. 5,218,771 still suffers from the problem of random measurement error.

In accordance with a first aspect of the present invention there is provided a two-axis angle sensor comprising a first bubble chamber containing two fluids of different characteristics such that a bubble is formed in the chamber;

a first bubble detector for generating a signal indicative of the orientation of the first bubble chamber with respect to a first detector axis by sensing the position of the bubble in the first bubble chamber;

a second bubble chamber containing two fluids of different characteristics such that a bubble is formed in the chamber;

a second bubble detector for generating a signal indicative of the orientation of the second bubble chamber with respect to a second detector axis by sensing the position of the bubble in the second bubble chamber, and a processor for calculating the angle of the sensor with respect to first and second measurement axes by combining the signals from the first and second bubble detectors in accordance with a predetermined algorithm, wherein the measurement axes are angularly offset from the detector axes.

Instead of aligning the bubble detectors and bubble chambers with the measurement axes and taking direct independent readings from the bubble detectors, we offset the bubble detectors and bubble chambers from the measurement axes and combine the signals from the bubble detectors. We have recognised that if the detector signals suffer from random errors with a gaussian distribution then the error associated with one bubble detector will tend to cancel out the error associated with the other bubble detector. Thus the combined measurement will be more accurate than a single independent measurement.

The bubble chambers and bubble detectors can then be provided in a sensor housing which is aligned with the measurement axes. Thus for example the sensor housing may comprise a joystick which is shaped to be gripped by the hand such that the "forward/reverse pitch" direction is aligned with one measurement axis and the "left/right roll" direction is aligned with the other measurement axis. Alternatively the sensor may be a "mouse" type computer input device which is gripped by the hand but not constrained to be used on a surface. In this case the sensor housing will be shaped to be gripped by one or more hands such that the "forward/reverse" direction is aligned with one measurement axis and the "left/right roll" direction is aligned with the other measurement axis. One or more buttons may also be provided in a position to ensure that the sensor housing is gripped in the preferred orientation. In a further alternative the sensor may be mounted in a vehicle or aeroplane with one of the measurement axes aligned with the direction of forward movement.

A variety of algorithms may be used, depending on the outputs of the detectors. In a preferred example the predetermined algorithm comprises:

summing a pair of values derived from the bubble detector signals to calculate the angle of the sensor with respect to the first measurement axis; and subtracting a pair of values derived from the bubble detector signals to calculate. the angle of the sensor with respect to the second measurement axis.

The precise form of the algorithm will depend on the angular relationship of the axes. These axes may be offset from each other by any desired angle. However in a preferred example the detector axes are arranged substantially at right angles to each other, and the measurement axes are arranged substantially at 45 degrees to the detector axes. This enables the bubble detector signals to be simply added or subtracted without requiring either signal to be scaled up or down with respect to the other signal before addition or subtraction.

A further problem with the arrangement of U.S. Pat. No. 5,794,355 is that some radiation may be transmitted through the viscous fluid making it difficult to detect the bubble. U.S. Pat. No. 5,794,355 addresses this problem by adding a dye to the viscous fluid to absorb the radiation. In addition there is no design freedom in the positioning of the radiation detector—ie. it must be positioned directly behind the container on the opposite side to the radiation source.

In U.S. Pat. No. 5,218,771 the materials forming the bubble and the liquid are chosen so that the interface surface between them is highly reflective. Thus the detector detects light reflected from the surface of the bubble. A problem with this arrangement is that there is no design freedom in the positioning of the radiation detector—ie. it must be positioned to receive the reflected light from the bubble.

In accordance with a second aspect of the present invention there is provided an angle sensor comprising a bubble chamber containing two fluids of different characteristics such that a bubble is formed in the chamber;

a radiation source for illuminating the bubble with radiation whereby the radiation is refracted by the bubble; and a radiation detector positioned to detect the refracted radiation from the bubble and generate a signal indicative of the angle of the bubble chamber.

In contrast to the conventional approach we detect refracted radiation from the bubble. As a result it is not necessary to dye the fluid. Furthermore we can accommodate different arrangements for the radiation source and radiation detector by selecting appropriate refractive indices for the bubble chamber and the two fluids. This is not possible in prior art systems which detect reflected or transmitted light since the angle of reflection or transmission is fixed regardless of the refractive indices.

In a preferred arrangement an interface is positioned to receive the refracted radiation from the bubble and deliver the refracted radiation to the radiation detector. This increases the amount of refracted radiation falling on the detector, thus improving the measurement accuracy.

A number of different interfaces may be provided. For instance the interface may comprise a light guide such as a fibre-optic cable. In one arrangement the interface comprises one or more lenses positioned between the bubble chamber and the radiation detector for focusing the refracted radiation onto the radiation detector. Alternatively the interface may comprise a radiation transmissive projection in the bubble chamber. The projection typically has a face arranged at an angle such that refracted radiation from the bubble passes through the face, and radiation from other directions is internally reflected by the face back into the bubble chamber.

In order to absorb radiation which has not been refracted by the bubble, the bubble chamber preferably has a radiation absorbent portion and a radiation transmissive window positioned adjacent to the bubble. This may be achieved by manufacturing the bubble chamber from two different materials having different radiation absorption characteristics. However in a preferred arrangement the radiation absorbent portion is formed by a coating of radiation absorbent material.

In the arrangement of U.S. Pat. No. 5,218,771 a single light source and a pair of light sensors are placed in a T-shaped arrangement with the sensors on opposite sides of the bubble chamber. Thus each sensor detects light which has been reflected to the right or to the left by the bubble. The position of the bubble is deduced by analysing the outputs of the sensors. A problem with this system is that a complex calculation must be performed using a standard table lookup scheme to deduce the position of the bubble. Therefore in a preferred embodiment of the present invention the radiation detector comprises a position sensitive detector, the position of the refracted radiation on the detector being indicative of the position of the bubble in the bubble chamber. This provides a simpler method of position measurement than U.S. Pat. No. 5,218,771.

Typically the position sensitive detector comprises an array of detectors, such as a charge-coupled device (CCD). Typically the array of detectors are arranged in a substantially straight line. If the bubble moves along a curved path then preferably a cylinder lens is provided to project the curved path onto a straight line detector.

In order to ensure that refracted radiation from the bubble falls onto the detector it is important to arrange the radiation source at the correct position. In a preferred embodiment the radiation source is positioned to illuminate the bubble with a beam of radiation which is offset from the centre of the bubble. This arrangement ensures that the refracted output beam subtends the illuminating beam at an angle. Conveniently a radiation guide is provided for guiding radiation between the radiation source and the bubble at the desired incident angle.

Typically the refractive index of the fluid forming the bubble is lower than the refractive index of the other fluid. In this arrangement the bubble causes the illuminating radiation to diverge, increasing the need for one or more lenses for focusing the refracted radiation onto the radiation detector. Conveniently bubble comprises a gas bubble (although two liquids could also be used).

Conveniently the radiation source comprises an infrared radiation source. This enables the radiation detector to be insensitive to stray visible background optical radiation.

Where two or more angle sensors are used, as for example in accordance with the first aspect of the invention, each may have its own radiation source and detector or they may use common sources and/or detectors by, for example, operating at different frequencies depending upon the sensor concerned.

An inertial sensor known as a vibrating structure gyroscope (VSG) is described in EP-A-0457541, JP-A-09050343 and "PS/2: GYROSCOPIC MOUSE DEVICE", IBM TECHNICAL DISCLOSURE BULLETIN, vol. 34, no. 11, April 1, 1992, pages 89–90. A common problem with VSGs is the need to manually set the device or provide a fixed or controlled horizon.

In accordance with a third aspect of the present invention there is provided an angle sensor comprising
a vibrating structure gyroscope (VSG) for generating a VSG signal indicative of the orientation of the sensor;
a bubble chamber containing two fluids of different characteristics such that a bubble is formed in the chamber;
a bubble detector for generating a calibration signal responsive to the position of the bubble in the bubble chamber; and
a processor for calibrating the VSG signal from the calibration signal in accordance with a predetermined calibration algorithm.

This provides a robust and cost effective method of calibrating the VSG signal.

Any calibration algorithm may be used but in a preferred arrangement the bubble detector generates the calibration signal when the bubble passes a centre point. The calibration signal thus provides an artificial horizon to calibrate the VSG signal.

A further problem with conventional angle sensors is that the sensor does not provide any resistance to operator input.

In accordance with a fourth aspect of the present invention there is provided an angle sensor comprising
means for generating a signal indicative of the orientation of the sensor; and
a flywheel which provides a gyroscopic force to oppose tilting of the sensor.

The flywheel creates the effect of a stable platform which increases operator feedback and dampens over-enthusiastic input from the operator. In a preferred arrangement means are provided to vary the speed of rotation of the flywheel in order to vary the gyroscopic force, for instance in conjunction with a game being played using the angle sensor as an input device.

The means for generating a signal indicative of the orientation of the sensor may comprise a VSG. However in a preferred arrangement the means for generating a signal indicative of the orientation of the sensor comprises:
a bubble chamber containing two fluids of different characteristics such that a bubble is formed in the chamber; and
a bubble detector for generating a signal indicative of the orientation of the first bubble chamber by sensing the position of the bubble in the bubble chamber.

Typically the flywheel is driven by a motor, for example a DC or three phase AC motor.

A further problem associated with bubble angle sensors is that it can be difficult to ensure that the bubble is of the correct size. If the bubble is too large or too small the accuracy of the sensor may be compromised.

In accordance with a fifth aspect of the present invention there is provided a method of manufacturing an angle sensor, the method comprising:
providing a container with an open end;
substantially filling the container with liquid;
providing a lid with one or more internal recesses;
closing the liquid filled container with the lid to form an enclosed bubble chamber, wherein on closing the container a gas bubble becomes trapped in the or each internal recess; and arranging a bubble detector to generate a signal indicative of the orientation of the bubble chamber by sensing the position of the gas bubble in the bubble chamber.

A number of recesses may be provided but in a preferred arrangement only a single recess is provided, the recess having a volume corresponding with the volume of bubble required. Typically the lid is pivotally attached to the container, and rotated to close the container.

In all these aspects of the invention, the bubble chamber preferably has a D-shape but it could also be circular or take some other convenient form.

The angle sensor according to the first, second, third, fourth and fifth aspects of the present invention may be employed in a variety of applications. However in a preferred example the angle sensor is incorporated in a user input device, for instance for a computer game console or a PC. The input device may comprise a joystick which is controlled by one hand, or a "mouse" type input device which is held in both hands and rotated in free space. Alternatively the angle sensor may be used to detect the orientation of a vehicle or aeroplane.

A number of embodiments of the present invention will now be described with reference to the accompanying drawings, in which:

FIG. 4 is a schematic perspective view of the two-axis angle sensor;

FIG. 5 is a cross-section through part of the bubble chamber showing the optical path of the illuminating radiation where no bubble is present;

FIG. 6 is a cross-section through the bubble chamber showing the radiation beam refracted by the bubble;

FIG. 7 is a schematic diagram of the processing electronics of the two-axis angle sensor;

FIG. 11 is a side view of the first stage of manufacture of a bubble chamber;

FIG. 12 is a cross-section through the centre of the bubble chamber after the lid has been closed;

FIG. 13 is a cross-section along line D in FIG. 12;

FIG. 14 is a cross-section along line E in FIG. 12;

Figure 1:
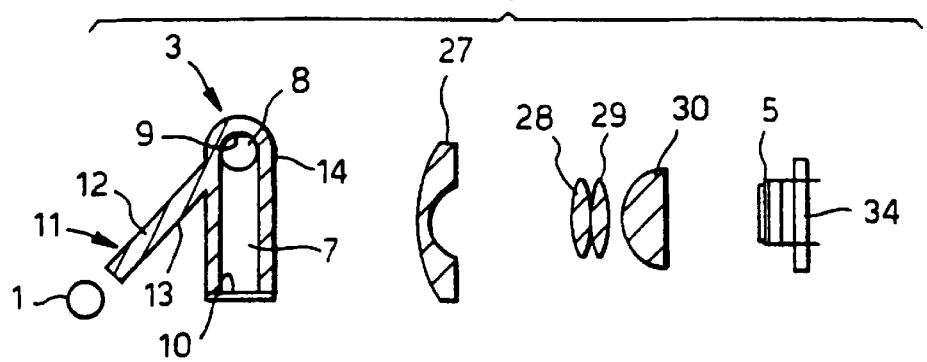
FIG. 1 is a cross-sectional view taken along line B in FIG. 2.
Figure 2:
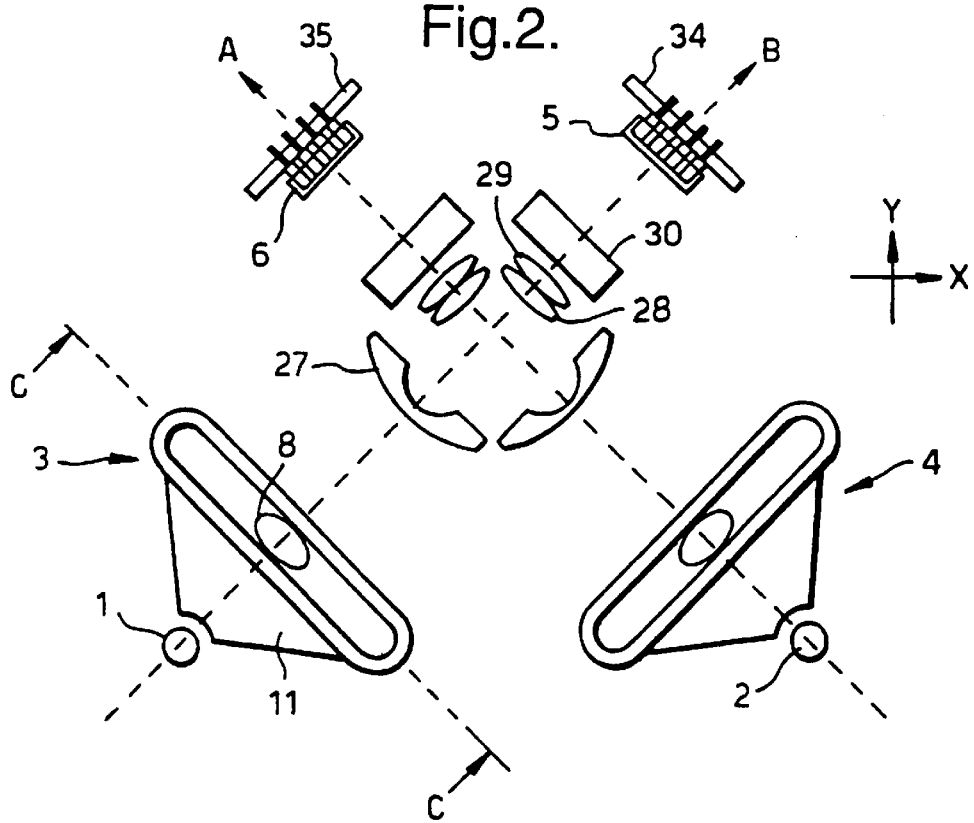
FIG. 2 is a plan view of a two-axis angle sensor.
Figure 3:
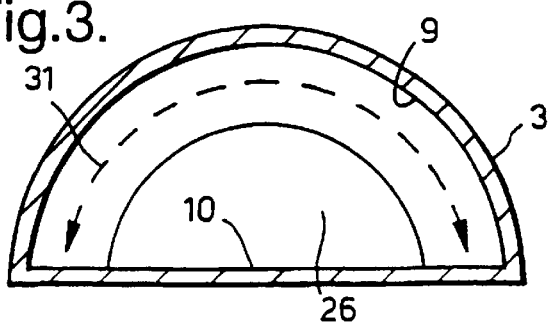
FIG. 3 is a cross-section taken along line C in FIG. 2.

Referring to FIGS. 1–4, a pair of infra-red point light sources 1, 2 each illuminate a respective transparent cast acrylic resin bubble chamber 3, 4 with infra-red radiation. Radiation from the bubble chamber 3 is imaged onto an infra-red CCD line sensor 5 and radiation from the bubble chamber 4 is imaged onto an infra-red CCD line sensor 6. The imaging optics for each bubble chamber 3, 4 is identical and the optics for bubble chamber 3 is shown in detail in FIG. 1.

The bubble chamber 3 has a D-shaped internal cavity with a semicircular upper surface 9 and a planar lower surface 10. The cavity is partially filled with a first fluid, ethanol 7, to leave a bubble 8 of a second fluid, air, which floats at the top of the cavity against the upper surface 9. As shown in FIG. 1, the D-shaped form of the cavity ensures that the bubble 8 engages the upper surface 9 but does not engage the lower surface 10. As a result the bubble 8 moves easily along an arcuate path 31 adjacent the curved upper surface 9 as the bubble chamber 3 is rotated. Of course other combinations of fluids such as water and air or two immiscible liquids could be used.

Infra-red radiation from the source 1 is guided towards the path 31 by a conically shaped guide 11 (shown clearly in the perspective view of FIG. 4) with parallel sides 12, 13. A projection 14 is also provided on the output side of the bubble chamber 3.

The principle optical modes of the sensor are shown in FIGS. 5 and 6. For the purposes of clarity, hashed cross-section lines are not included in FIGS. 5 and 6. As shown in FIG. 5, with no bubble present radiation 15 from the light source 1 passes substantially unrefracted through the bubble chamber 3 (apart from a small amount of refraction at the acrylic/ethanol interfaces) With a bubble present the illuminating beam of radiation is refracted downwards by the bubble as shown in FIG. 5 and discussed in detail below.

The parallel sides 12, 13 of the light guide 11 subtend an angle of 43° with a horizontal line 16. As a result, an illuminating beam of radiation from the light source 1 is directed upwards at an angle of 43° towards the bubble as indicated by a ray 17. The illuminating beam is refracted slightly downwards at the acrylic/ethanal interface as indicated by a ray 18. The ray 18 (which is at the centre of the illuminating beam) is offset from the centre 33 of the bubble 8. As a result the illuminating beam is refracted downwards at the ethanol/air interface as indicated by a ray 19. The angle of refraction is relatively large due to the large change in refractive index at the ethanol/air interface. If necessary the angle of refraction can be adjusted by choosing different fluids. The radiation is then refracted downwards further at the air/ethanol interface as indicated by a ray 20. Finally the radiation is refracted slightly at the ethanol/acrylic interface to give an output beam indicated by ray 24.

The refractive indices of the fluids and the size of the bubble 8 are chosen so that the output beam is directed towards the projection 14 and subtends an angle of 43° with the horizontal line 16. In one example the acrylic forming the bubble chamber 3 has a refractive index of 1.49, the ethanol has a refractive index of 1.36 and the air bubble 8 has a refractive index of approximately 1.00.

The projection 14 has an upper face 21 which subtends an angle of 43° with the horizontal line 16. The projection 14 also has an angled output face 23 which is substantially perpendicular to the output beam. This ensures that the output beam (as illustrated by ray 24) is transmitted by the output face 23 without being reflected.

Whilst the primary optical path of the illuminating radiation is illustrated in FIG. 5, some of the radiation will follow other optical paths. For instance some radiation will be reflected by the far wall of the bubble and scattered back into the bubble. This results in an even background illumination. A D-shaped optically absorbent coating 25, 26 (shown in FIGS. 3, 5 and 6) is provided on the front and rear walls of the cavity in the lower part of the chamber in order to attenuate this background illumination. In addition any stray radiation which falls on the angled output face 23 at an angle less than the acrylic/air critical angle of 42° will be reflected back into the bubble chamber.

Referring back to FIGS. 1 and 2, a wide-angle plano-concave lens 27 and a pair of double convex lenses 28, 29 image the radiation from the projection 14 to a flat plane (not shown). Two double convex lenses 28, 29 are used as the required focal length is short and this is more readily obtained using a pair of lenses. A cylinder lens 30 modifies the optical path so that the semicircular path 31 is imaged onto the straight line sensor 5 irrespective of the change in vertical position as the bubble 8 moves in the semicircular arc. The cylinder lens 30 has the additional function of expanding the apparent movement of the radiation from the bubble as the bubble traverses towards the more extreme limits of travel. As it is moving along the path 31 the bubble's motion in the horizontal is proportionally reduced, but the effect of the cylinder lens 30 is to expand this to a more linear displacement along the line sensor 5.

The line sensors 5, 6 are conveniently mounted on respective circuit boards 34, 35. The optical axis of the lenses is optimally aligned with the centre of the path 31 of the bubble in the chamber.

Referring to FIG. 7, the detection signals 40, 41 from the CCD line sensors 5, 6 are fed to a single chip micro-controller 42 which executes an internally stored programme. The micro-controller 42 converts the analogue detection signals 40, 41 for each pixel of each line sensor 5, 6 into a digital value using the micro-controller's onboard analogue to digital converter. The microcontroller 42 also performs ancillary functions—such as checking for key switch closures from a keypad array 43, displaying user selected configurations with a symbol display 44, and storing or retrieving configuration set-ups and/or calibration data in a non-volatile storage device 45.

The micro-controller 42 calculates the angle of the sensor and communicates the angle of the sensor (and any other data) to a host controller 46 (such as a computer game console or PC). The angle is calculated with respect to perpendicular measurement axes X,Y (shown in FIGS. 2 and 4) using the algorithm discussed below with reference to FIGS. 8–10.

Figure 8:
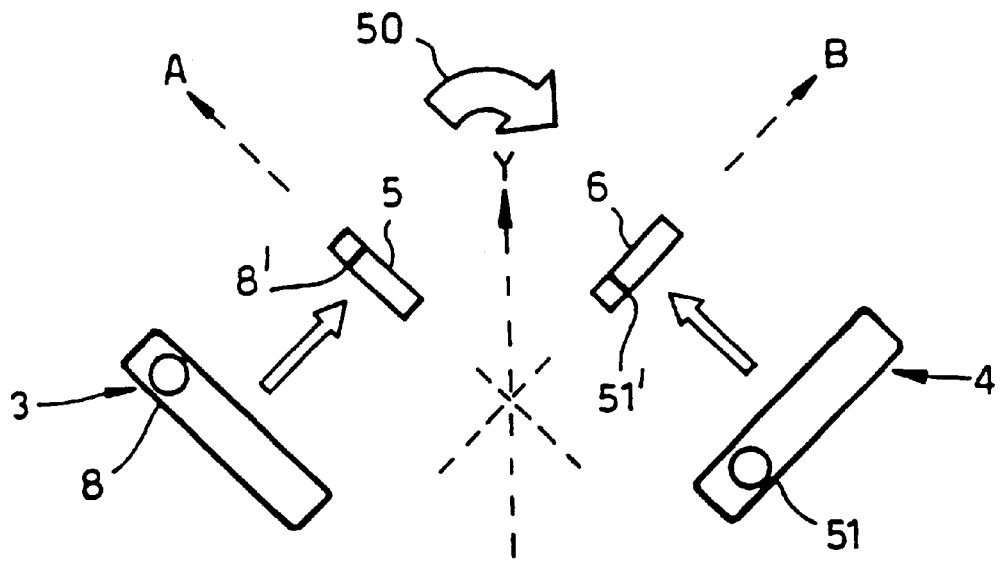
FIGS. 8–10 are schematic plan views of the two-axis angle sensor of FIG. 2.
Figure 9:
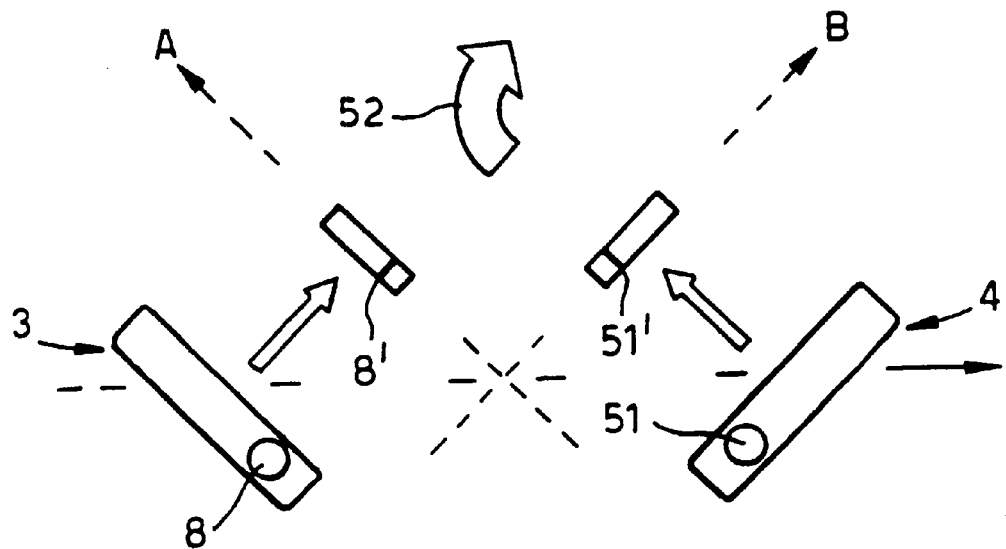
Figure 10:
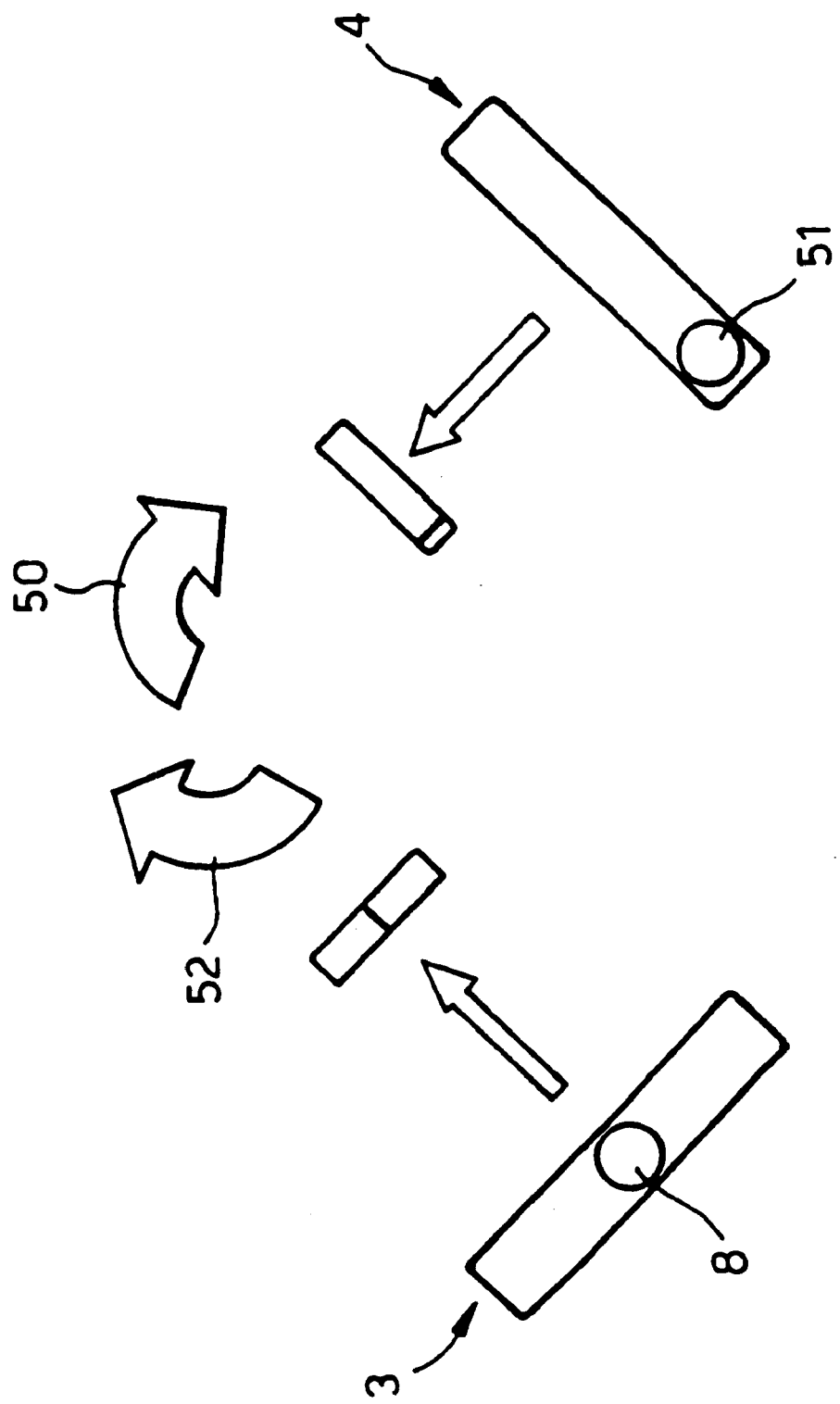

In the schematic representations of FIGS. 8–10, the two line sensors 5,6 are shown with +/− positions in the same sense as the bubble chambers 3,4. In practice bubble displacement is detected as a movement in the direction opposite to the bubble movement due to the inversion of the image by the lenses 27–30. This inversion is accounted for in practical implementations but is ignored in FIGS. 8–10 for the sake of clarity.

The line sensors 5,6 are aligned with perpendicular detector axes A,B at 45° to the X and Y measurement axes.

In FIG. 8 the sensor has been rotated clockwise about the Y axis as indicated at 50. As a result, the bubble 8 (and also the corresponding bright spot 8' on the line sensor 5) has moved in the positive A direction. The bubble 51 (and associated bright spot 51' on line sensor 6) has moved in the negative B direction.

In FIG. 9 the sensor has been rotated anti-clockwise about the X axis as indicated at 52. Bubble 8 and bubble 51 have moved in the negative A and B directions respectively.

In FIG. 10 the sensor has been rotated clockwise about the Y axis as indicated at 50 and anti-clockwise about the X axis as indicated at 52. As a result the bubble 8 has moved back to the centre of the chamber whilst the bubble 51 has moved towards the negative B end of the chamber.

The microcontroller 42 thus implements the following algorithm, where:

Bubble position at Center=50
Full positive movement=101
Full negative movement=0
A=position of bubble 8 in direction A
B=position of bubble 51 in direction B $\theta_y = A - B$ E.g. for A=50, B=50 (center about y axis)

$\theta_y = 50 - 50 = 0$

E.g. for A=70, B=30 (right roll about y-axis)

$\theta_y = 70 - 30 = 40$

E.g. for A=101, B=0 (full right roll about y-axis)

$\theta_y = 101 - 0 = 101$

E.g. for A=35, B=65 (left roll about y-axis)

$\theta_y = 35 - 65 = -30$

E.g. for A=0, B=101 (Full left roll about y-axis)

$\theta_y = 0 - 101 = -101$ $\theta_x = ((\text{Center} - A) + (\text{Center} - B))$ E.g. for A=50, B=50 (center about x-axis)

$\theta_x = ((50 - 50) + (50 - 50)) = 0$

E.g. for A=30, B=30 (forward pitch about x-axis)

$\theta = ((50 - 30) + (50 - 30)) = 40$

E.g. for A=65, B=65 (reverse pitch about x-axis)

$\theta_x = ((50 - 65) + (50 - 65)) = -30.$

The values $\theta_x$ and $\theta_y$ are output by the micro-controller 42 to the host 46 and can be used (for example) to issue commands to a computer game being executed by the host 46.

A method of manufacturing one of the bubble chambers 3,4 will now be described with reference to FIGS. 11–14. The acrylic bubble chamber is formed as an open D-shaped container 60 with a flange 62 extending around its lower edge. A lid 61 is attached to the container 60 by a sprung hinge 63. The lid 61 also has a domed recess 65 and a flexible U-shaped locking member 64. The container is filled to the brim with ethanol and then the lid 61 is closed and snapped shut with the flange 62 received in the U-shaped locking member 64 as shown in FIGS. 12–14. This leaves an air bubble with a volume approximately equal to the volume of the recess 65 in the bubble chamber. More than one recess 65 may be formed in the lid 61 if required to make a larger bubble.

Figure 15:
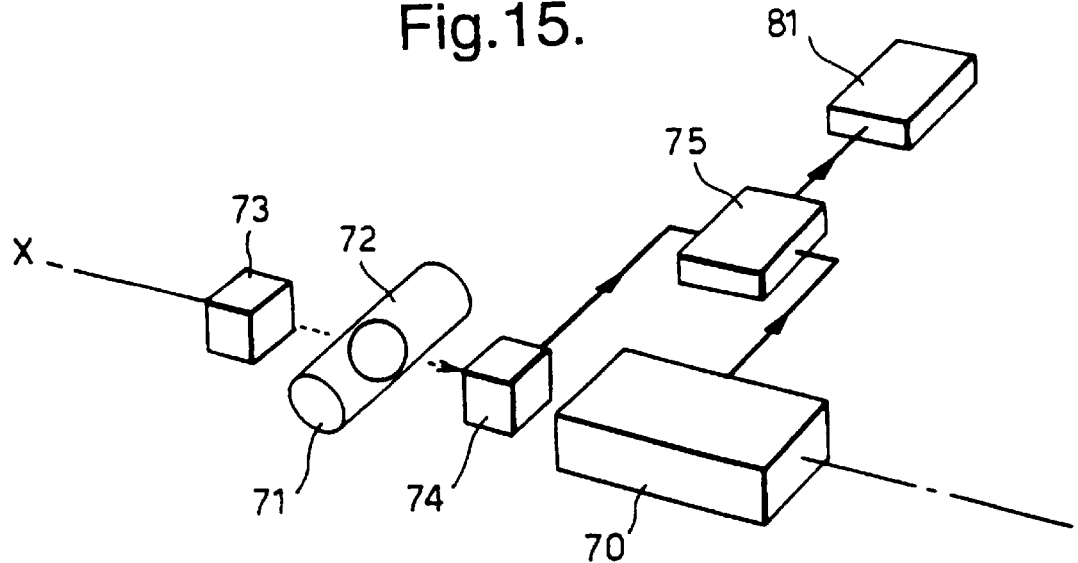
FIG. 15 is a schematic view of an alternative angle sensor incorporating a VSG.

In the alternative embodiment of FIG. 15, a digital vibrating structure gyroscope 70 (such as the ENC-05E sensor manufactured by Murata) generates an electronic signal indicating the amount and direction of movement in degrees about the X-axis. A cylindrical bubble chamber 71 contains two fluids of different characteristics such that a bubble 72 is formed in the chamber 71. A light emitting diode 73 emits a narrow beam of light through the centre of the bubble chamber 71 towards a light sensor 74. As the bubble 72 passes the centre point it is detected by the sensor 74.

Figure 16:
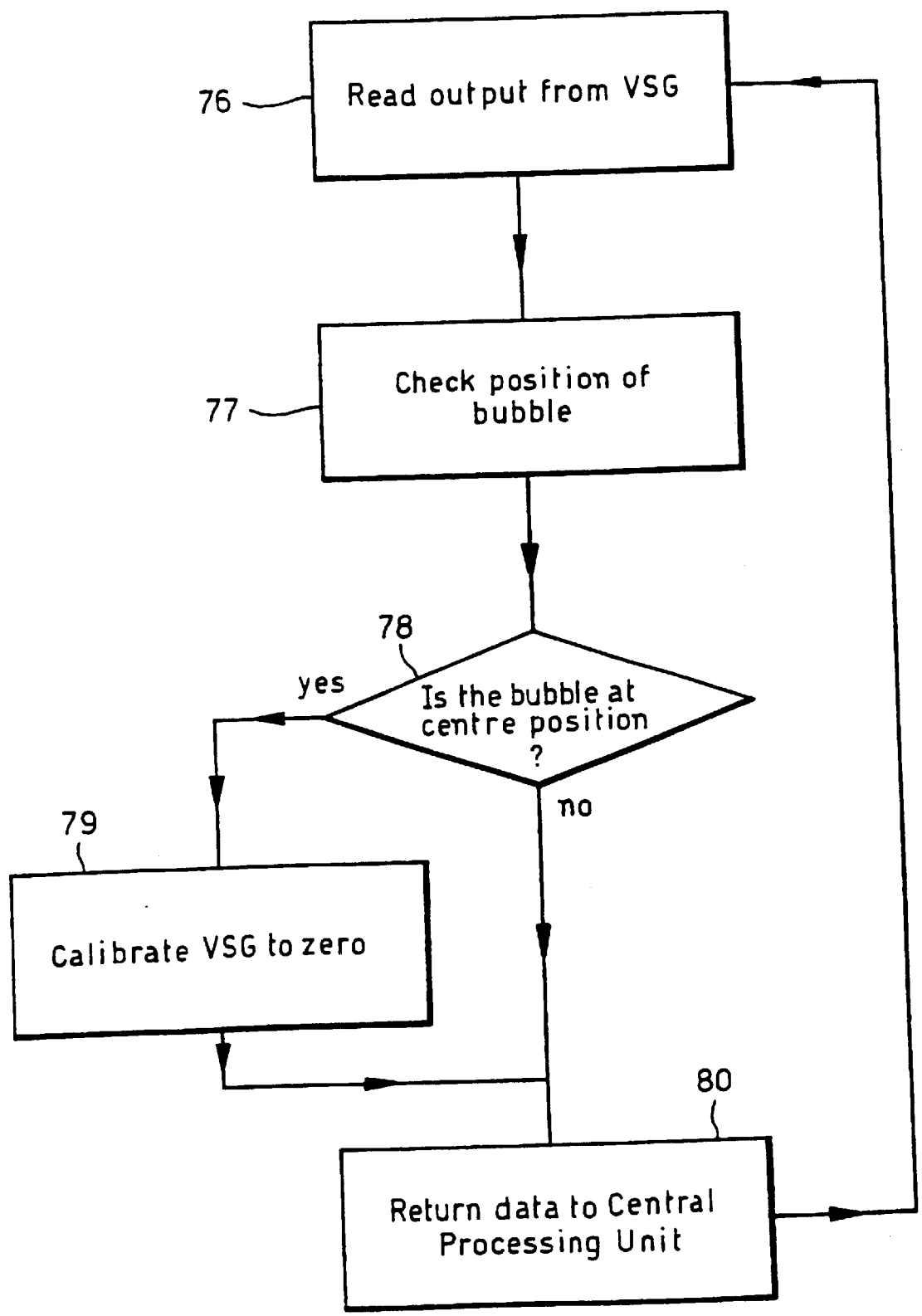
FIG. 16 illustrates a calibration routine implemented by the microprocessor.

A microcontroller 75 implements the calibration routine shown in FIG. 16. The microcontroller reads the VSG signal at 76 and checks the position of the bubble at 77. If the bubble is at the centre position (78) then the signal from the VSG is calibrated to zero at 79. The calibrated data is then returned to a CPU 81 at 80. Two of the devices of FIG. 15 can be positioned to create a two-axis angle sensor of the type shown in FIG. 1.

Figure 17:
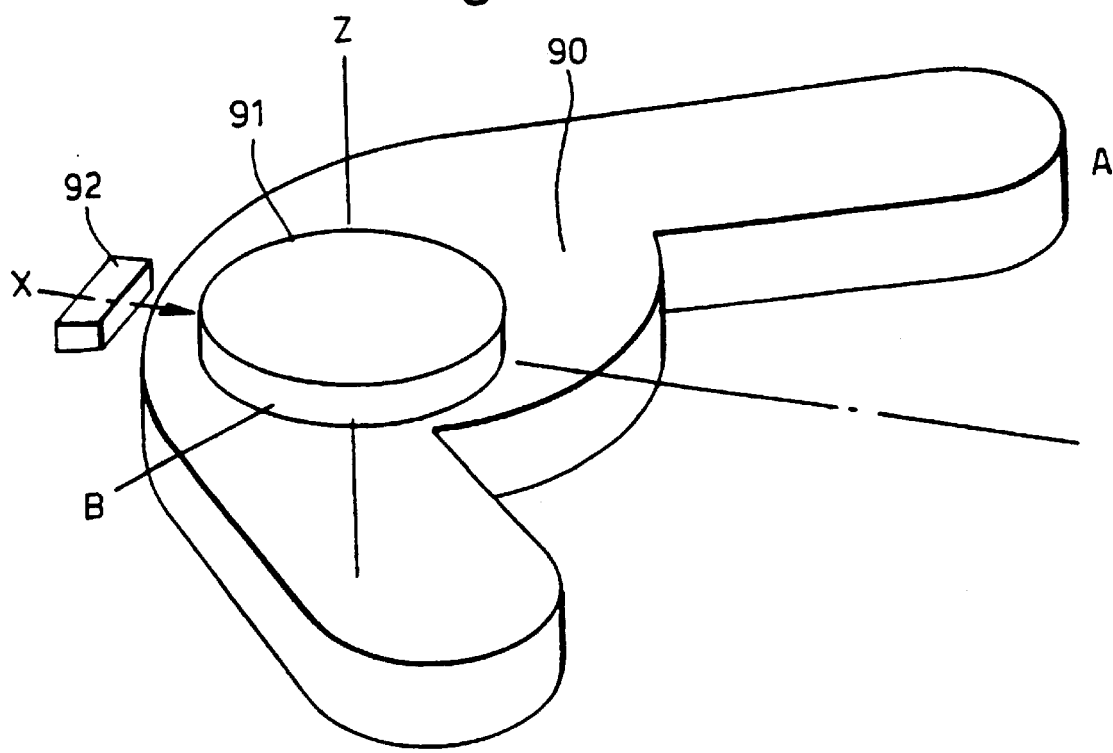
FIG. 17 is a schematic illustration of an alternative angle sensor incorporating a fly-wheel.

In a further alternative embodiment shown in FIG. 17, an angle sensor 90 (for instance the bubble angle sensor of FIG. 1 or the VSG angle sensor of FIG. 15) generates a signal indicative of the orientation of the sensor. A flywheel 91 (which is preferably in the form of an AC synchronous motor) is rotated about the Z axis to create a gyroscopic force when the sensor 90 is banked to one side about the X axis. This resistance creates the effect of a stable platform which can increase operator feedback and gaming pleasure and dampens over enthusiastic input from the operator.

A controller 92 is provided to alter the speed of rotation of the flywheel 91 in conjunction with a particular game being played. Thus when the flywheel 91 is speeded up the operator finds it more difficult to bank the sensor, and when the flywheel 91 is slowed down it becomes easier to bank the sensor.

In another application, a vibration effect can be achieved by repeatedly and quickly speeding up and slowing down the flywheel.

Figure 18:
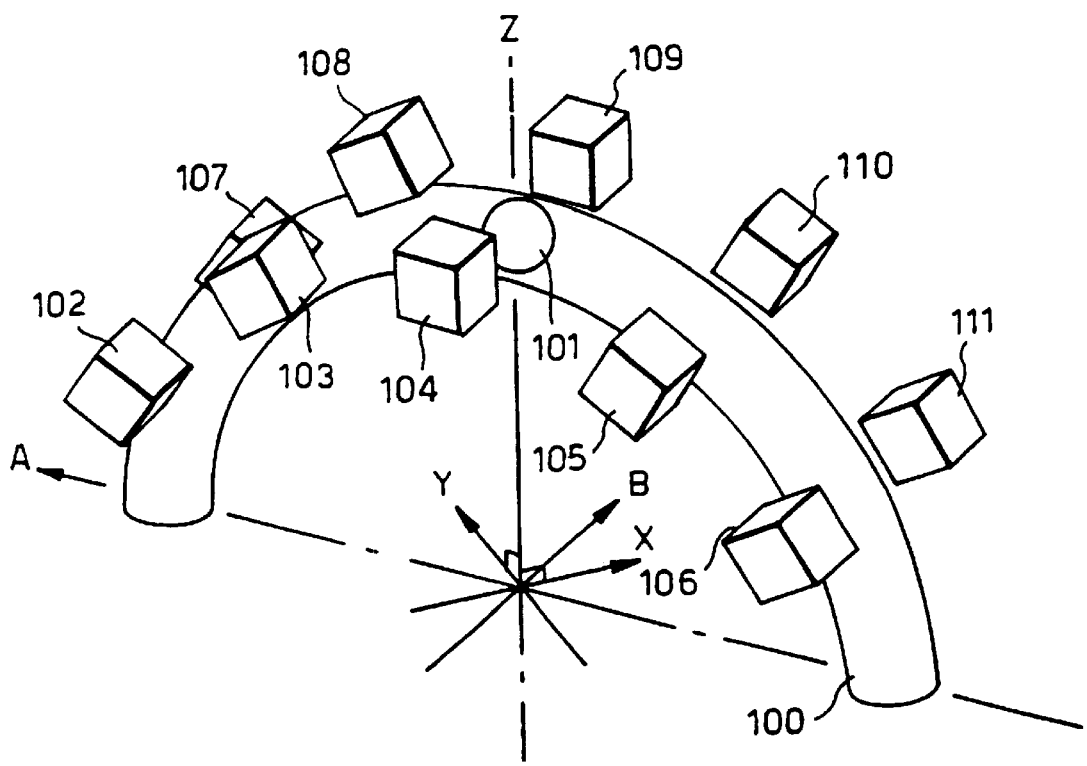
FIG. 18 is a perspective view of part of an alternative two-axis angle sensor.

FIG. 18 is a perspective view of an alternative angle sensor. A curved tubular bubble chamber 100 is aligned with axis A and contains an air bubble 101 which moves along the bubble chamber 100 when the bubble chamber is rotated about the detector axis B. Five light emitting diodes 102–106 are arranged with equal spacing on one side of the bubble chamber 100. Five light detectors 107–111 are arranged on the opposite side of the bubble chamber 100. Thus five consecutive positions of the bubble 101 can be detected. In this example the sensor is conveniently arranged so that the light emitting diodes 102–106 and detectors 107–111 can share their information, creating twice as many incrementations as the number of detectors. A second bubble chamber (not shown) and a second set of diodes/detectors (not shown) is aligned with the B-axis to give a two-axis sensor similar to the sensor of FIG. 1. The signals from the ten detectors are combined to calculate the orientation of the sensor with respect to measurement axes X,Y.

Figure 19:
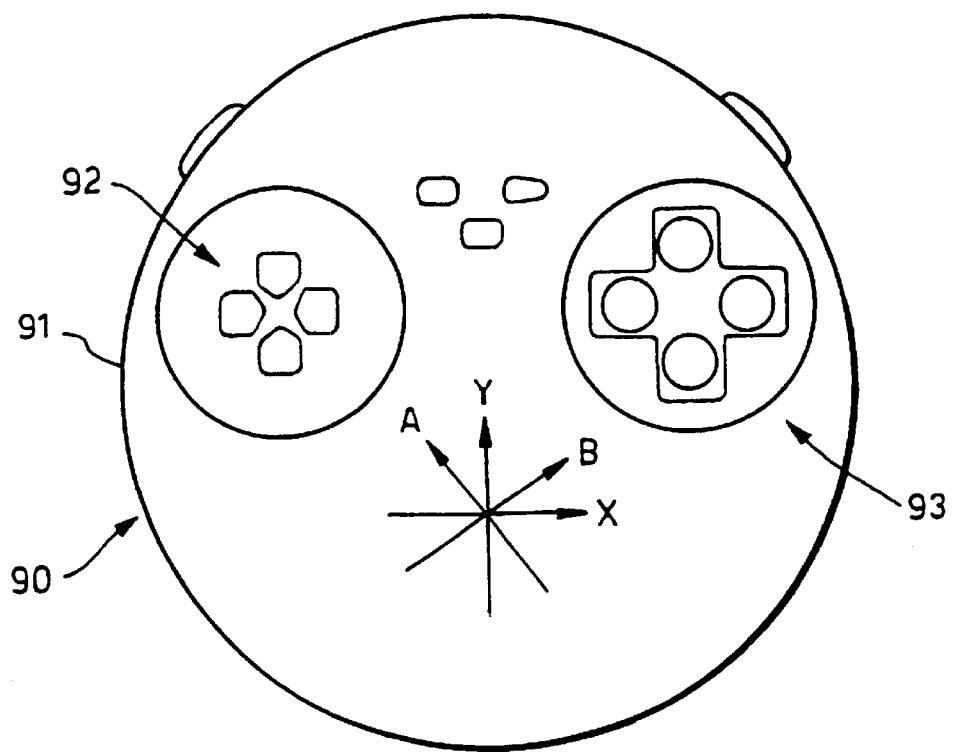
FIG. 19 is a plan view of a user input device.

FIG. 19 is a plan view of a computer game console input device 90 housing an angle sensor (not shown). Any one of the sensors shown in FIGS. 1–10, 15, 17 or 18 may be used. As shown in FIG. 19, the sensor housing 91 is provided with a set of buttons 92 and a cursor controller 93. The sensor (not shown) is arranged with its detector axes A,B and measurement axes X,Y as shown in FIG. 19. The input device 90 is designed to be held by both hands with the buttons 92 being operated by the right thumb, and the cursor controller 93 being operated by the left thumb. This ensures that the Y measurement axis points directly forward as viewed by the operator. The housing 91 may also be shaped suitably (for instance it may be rectangular or triangular in plan) to ensure that the input device is held in the correct orientation.

The input device 90 is connected, in use, to a computer game console or PC via a flexible cable (not shown). Thus control of a game is achieved by holding the device in free space and tilting the device to the left or right to issue a move left or move right command.

What is claimed is:

1. A two-axis angle sensor comprising
   a first bubble chamber containing two fluids of different characteristics such that a bubble is formed in the chamber;
   a first bubble detector for generating a signal indicative of the orientation of the first bubble chamber with respect to a first detector axis by sensing the position of the bubble in the first bubble chamber;
   a second bubble chamber containing two fluids of different characteristics such that a bubble is formed in the chamber;
   a second bubble detector for generating a signal indicative of the orientation of the second bubble chamber with respect to a second detector axis by sensing the position of the bubble in the second bubble chamber; and
   a processor for calculating the angle of the sensor with respect to first and second measurement axes by combining the signals from the first and second bubble detectors in accordance with a predetermined algorithm, wherein the measurement axes are angularly offset from the detector axes.

2. A sensor according to claim 1 wherein the predetermined algorithm comprises:
   summing a pair of values derived from the bubble detector signals to calculate the angle of the sensor with respect to the first measurement axis; and
   subtracting a pair of values derived from the bubble detector signals to calculate the angle of the sensor with respect to the second measurement axis.

3. A sensor according to claim 1 wherein the detector axes are arranged substantially at right angles to each other.

4. A sensor according to claim 3 wherein the detector axes are arranged substantially at 45 degrees to the measurement axes.

5. A sensor according to claim 1 further comprising a sensor housing for housing the bubble chambers and bubble detectors, wherein the sensor housing is aligned with the measurement axes.

6. A sensor according to claim 1 wherein the or each bubble chamber is shaped such that the bubble only engages an upper surface of the chamber.

7. A sensor according to claim 1 wherein the or each bubble chamber is substantially D-shaped.

8. An angle sensor according to claim 1 comprising a flywheel which provides a gyroscopic force to oppose tilting of the sensor.

9. A sensor according to claim 8 wherein the flywheel is rotated by an electric motor.

10. A user input device comprising a sensor according to claim 1.

11. An angle sensor comprising
    a bubble chamber containing two fluids of different characteristics such that a bubble is formed in the chamber;
    a radiation source for illuminating the bubble with radiation whereby the radiation is refracted by the bubble; and
    a radiation detector positioned to detect radiation refracted by the bubble and generate a signal indicative of the angle of the bubble chamber.

12. A sensor according to claim 11 further comprising an interface positioned to receive the refracted radiation from the bubble and deliver the refracted radiation to the radiation detector.

13. A sensor according to claim 12 wherein the interface comprises one or more lenses positioned between the bubble chamber and the radiation detector for focusing the refracted radiation onto the radiation detector.

14. A sensor according to claim 13 wherein the lens or one of the lenses comprises a cylinder lens.

15. A sensor according to claim 12 wherein the interface comprises a radiation transmissive projection in the bubble chamber.

16. A sensor according to claim 11 wherein the bubble chamber has a radiation absorbent portion and a radiation transmissive window positioned adjacent to the bubble.

17. A sensor according to claim 16 wherein the radiation absorbent portion is formed by a coating of radiation absorbent material.

18. A sensor according to claim 11 wherein the radiation detector comprises a position sensitive detector, the position of the refracted radiation on the detector being indicative of the position of the bubble in the bubble chamber.

19. A sensor according to claim 18 wherein the position sensitive detector comprises an array of detectors.

20. A sensor according to claim 19 wherein the array of detectors are arranged in a substantially straight line.

21. A sensor according to claim 11 further comprising a radiation guide for guiding radiation between the radiation source and the bubble.

22. A sensor according to claim 11 wherein the radiation source is positioned to illuminate the bubble with a beam of radiation which is offset from the centre of the bubble.

23. A sensor according to claim 11 wherein the refractive index of the fluid forming the bubble is lower than the refractive index of the other fluid.

24. A sensor according to claim 11 wherein the radiation source comprises an infra-red radiation source.

25. An angle sensor according to claim 6 comprising
a vibrating structure gyroscope (VSG) for generating a VSG signal indicative of the orientation of the sensor; and
a processor for calibrating the VSG signal from the calibration signal in accordance with a predetermined calibration algorithm.

26. An angle sensor comprising:
a bubble chamber containing a liquid and a gas bubble; and
a bubble detector for generating a signal indicative of the orientation of the bubble chamber by sensing the position of the gas bubble in the bubble chamber,
wherein the bubble chamber has one or more internal recesses having a total volume substantially equal to the volume of the gas bubble.

27. A method of angle detection, the method comprising:
(1) providing an angle sensor comprising first and second bubble chambers each containing two fluids of different characteristics such that a bubble is formed in each chamber;
(2) generating a first signal indicative of the orientation of the first bubble chamber with respect to a first detector axis by sensing the position of the bubble in the first bubble chamber;
(3) generating a second signal indicative of the orientation of the second bubble chamber with respect to a second detector axis by sensing the position of the bubble in the second bubble chamber; and
(4) calculating the angle of the sensor with respect to first and second measurement axes by combining the first and second signals in accordance with a predetermined algorithm wherein the detector axes are angularly offset from the measurement axes.

28. A method of angle detection, the method comprising
providing a bubble chamber containing two fluids of different characteristics such that a bubble is formed in the chamber;
illuminating the bubble with radiation whereby the radiation is refracted by the bubble; and
detecting radiation refracted by the bubble to generate a signal indicative of the angle of the bubble chamber.

29. A method of manufacturing an angle sensor, the method comprising:
providing a container with an open end;
substantially filling the container with liquid;
providing a lid with one or more internal recesses;
closing the liquid filled container with the lid to form an enclosed bubble chamber, wherein on closing the container a gas bubble becomes trapped in the or each internal recess; and
arranging a bubble detector to generate a signal indicative of the orientation of the bubble chamber by sensing the position of the gas bubble in the bubble chamber.

* * * * *